(12) United States Patent
Doran et al.

(10) Patent No.: US 7,434,231 B2
(45) Date of Patent: Oct. 7, 2008

(54) METHODS AND APPARATUS TO PROTECT A PROTOCOL INTERFACE

(75) Inventors: Mark Doran, Olympia, WA (US); Vincent Zimmer, Federal Way, WA (US); Michael Rothman, Gig Harbor, WA (US); Hung Tran, Lake Forest, CA (US); Andy Miga, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 10/608,586

(22) Filed: Jun. 27, 2003

(65) Prior Publication Data

US 2004/0268368 A1 Dec. 30, 2004

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/00 | (2006.01) |
| G06F 9/24 | (2006.01) |
| G06F 15/177 | (2006.01) |
| G06F 7/04 | (2006.01) |
| G06F 17/30 | (2006.01) |
| H04L 9/32 | (2006.01) |
| H04L 9/00 | (2006.01) |
| H03M 1/68 | (2006.01) |
| H04N 7/16 | (2006.01) |

(52) U.S. Cl. .............. 719/321; 713/1; 713/2; 726/2; 726/26

(58) Field of Classification Search ............ 714/100, 714/1, 48, 799; 710/36, 107; 719/321; 713/1, 713/2; 726/2, 26
See application file for complete search history.

(56) References Cited

U.S. PATENT DOCUMENTS

| | | | | |
|---|---|---|---|---|
| 6,449,652 | B1 * | 9/2002 | Blumenau et al. | 709/229 |
| 6,697,948 | B1 * | 2/2004 | Rabin et al. | 726/30 |
| 6,907,521 | B2 * | 6/2005 | Saw-Chu et al. | 713/1 |
| 6,907,522 | B2 * | 6/2005 | Morais et al. | 713/2 |
| 6,961,848 | B2 * | 11/2005 | Fish et al. | 713/2 |
| 6,993,581 | B1 * | 1/2006 | Blumenau et al. | 709/225 |
| 6,993,589 | B1 * | 1/2006 | Blumenau et al. | 709/229 |
| 7,007,159 | B2 * | 2/2006 | Wyatt | 713/1 |
| 7,103,529 | B2 * | 9/2006 | Zimmer | 703/27 |
| 7,127,579 | B2 * | 10/2006 | Zimmer et al. | 711/163 |
| 2002/0161884 | A1 * | 10/2002 | Munger et al. | 709/224 |
| 2003/0110369 | A1 * | 6/2003 | Fish et al. | 713/1 |
| 2003/0110370 | A1 * | 6/2003 | Fish et al. | 713/2 |

(Continued)

OTHER PUBLICATIONS

"Extensible Firmware Interface Specification," Dec. 12, 2000, Intel, Version 1.02, pp. 31,60.*

(Continued)

*Primary Examiner*—Meng-Ai An
*Assistant Examiner*—Qing-Yuan Wu
(74) *Attorney, Agent, or Firm*—Hanley, Flight & Zimmerman, LLC.

(57) ABSTRACT

Methods and apparatus to protect a protocol interface are described herein. In an example method, a driver request is received during an operation phase of firmware in a processor system. The driver request may be identified as a request associated with a violating condition of the protocol interface. Accordingly, the driver request is rejected.

12 Claims, 8 Drawing Sheets

U.S. PATENT DOCUMENTS

| | | | |
|---|---|---|---|
| 2004/0064457 A1* | 4/2004 | Zimmer et al. | 707/100 |
| 2004/0103205 A1* | 5/2004 | Lindblad et al. | 707/100 |
| 2004/0230963 A1* | 11/2004 | Rothman et al. | 717/168 |
| 2004/0255286 A1* | 12/2004 | Rothman et al. | 717/168 |
| 2004/0267708 A1* | 12/2004 | Rothman et al. | 707/3 |
| 2005/0015430 A1* | 1/2005 | Rothman et al. | 709/201 |

OTHER PUBLICATIONS

"Extensible Firmware Interface Specification," Dec. 12, 2000, Intel, Version 1.02.*

Kinney, Michael, "Solving BIOS Boot Issues with EFI," Sep. 2000, Intel, pp. 1-6.*

Extensible Firmware Interface Specification, Intel Corporation, Version 1.10, Dec. 1, 2002, 1084 pages.

Extensible Firmware Interface Specification, Version 1.10, Specification Update, Intel Corporation, Version -001, Nov. 26, 2003, 63 pages.

* cited by examiner

METHODS AND APPARATUS TO PROTECT A PROTOCOL INTERFACE

TECHNICAL FIELD

The present disclosure relates generally to firmware, and more particularly, to and apparatus to protect a protocol interface.

BACKGROUND

The initial phases of computer or processor system operation (i.e., prior to the booting of an operating system by the processor system) following a power-up or a reset are controlled by a basic input/output system (BIOS). In general, the BIOS is implemented as software or firmware in the form of machine readable instructions that are stored in a non-volatile memory coupled to a processor. Following a reset operation or the application of power to the processor, the processor executes the BIOS instructions. Typically, the BIOS performs one or more hardware and software configuration and test activities prior to booting the operating system. The configuration activities carried out by the BIOS are responsible for establishing the manner in which hardware devices (e.g., disk drives, video controllers, keyboard, mouse, etc.) associated with the processor system interact with the operating system executed by the processor system. The test activities collect system configuration information that may be later used, for example, by the operating system to determine that hardware or devices associated with the system are ready for use and to facilitate debugging activities, configuration management activities, etc.

Typically, certain protocol interfaces such as architectural protocols (APs) should only be called by designated program(s). In a driver execution environment (DXE) phase, for example, protocol interfaces should only be called by a DXE core. However, some protocol interfaces may be inadvertently or maliciously accessed by callers other than the DXE core. That is, a protocol interface may be incorrectly called and/or replaced. For example, a driver may discover a protocol interface and replace the authentic version of the protocol interface that was previously installed with a fake version of the protocol interface. In another example, the driver may turn off services provided by the protocol interface while the DXE core is operating under the assumption that those services are enabled. As a result, the protocol interface may not be available when an authorized call of the protocol interface is placed.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
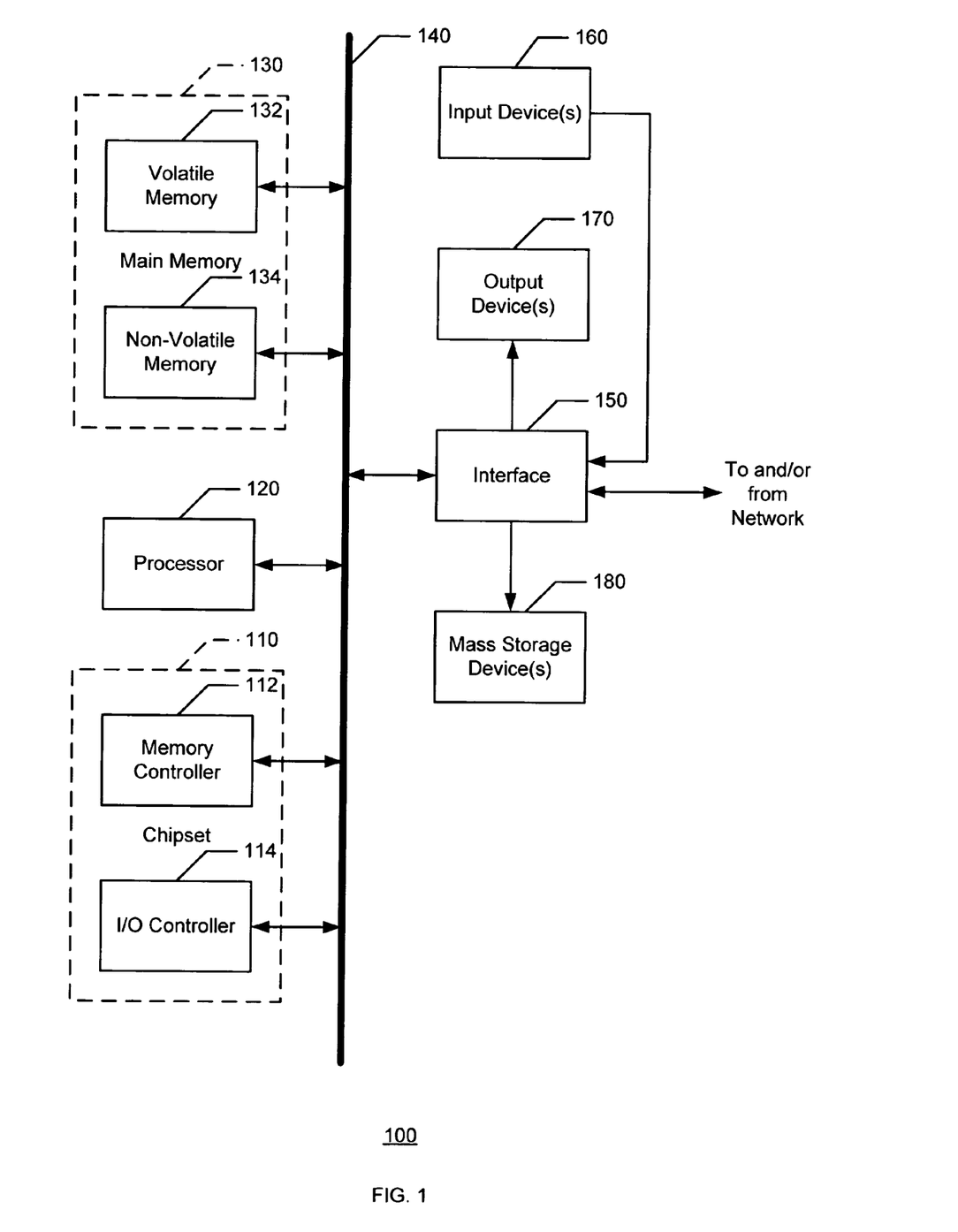
FIG. 1 is a block diagram representation of an example processor system.

FIG. 1 is a block diagram of an example processor system 100 adapted to implement the methods and apparatus disclosed herein. The processor system 100 may be a desktop computer, a laptop computer, a notebook computer, a personal digital assistant (PDA), a server, an Internet appliance or any other type of computing device.

The processor system 100 illustrated in FIG. 1 includes a chipset 110, which includes a memory controller 112 and an input/output (I/O) controller 114. As is well known, a chipset typically provides memory and I/O management functions, as well as a plurality of general purpose and/or special purpose registers, timers, etc. that are accessible or used by a processor 120. The processor 120 is implemented using one or more in-order processors. For example, the processor 120 may be implemented using one or more of the Intel® Pentium® family of microprocessors, the Intel® Itanium® family of microprocessors, Intel® Centrino® family of microprocessors, and/or the Intel XScale® family of processors. In the alternative, other processors or families of processors may be used to implement the processor 120.

As is conventional, the memory controller 112 performs functions that enable the processor 120 to access and communicate with a main memory 130 including a volatile memory 132 and a non-volatile memory 134 via a bus 140. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 134 may be implemented using flash memory, Read Only Memory (ROM), Electrically Erasable Programmable Read Only Memory (EEPROM), and/or any other desired type of memory device.

The processor system 100 also includes an interface circuit 150 that is coupled to the bus 140. The interface circuit 150 may be implemented using any type of well known interface standard such as an Ethernet interface, a universal serial bus (USB), a third generation input/output interface (3GIO) interface, and/or any other suitable type of interface.

One or more input devices 160 are connected to the interface circuit 150. The input device(s) 160 permit a user to enter data and commands into the processor 120. For example, the input device(s) 160 may be implemented by a keyboard, a mouse, a touch-sensitive display, a track pad, a track ball, an isopoint, and/or a voice recognition system.

One or more output devices 170 are also connected to the interface circuit 150. For example, the output device(s) 170 may be implemented by display devices (e.g., a light emitting display (LED), a liquid crystal display (LCD), a cathode ray tube (CRT) display, a printer and/or speakers). The interface circuit 150, thus, typically includes, among other things, a graphics driver card.

The processor system 100 also includes one or more mass storage devices 180 configured to store software and data. Examples of such mass storage device(s) 180 include floppy disks and drives, hard disk drives, compact disks and drives, and digital versatile disks (DVD) and drives.

The interface circuit 150 also includes a communication device such as a modem or a network interface card to facilitate exchange of data with external computers via a network. The communication link between the processor system 100 and the network may be any type of network connection such as an Ethernet connection, a digital subscriber line (DSL), a telephone line, a cellular telephone system, a coaxial cable, etc.

Access to the input device(s) 160, the output device(s) 170, the mass storage device(s) 180 and/or the network is typically controlled by the I/O controller 114 in a conventional manner. In particular, the I/O controller 114 performs functions that enable the processor 120 to communicate with the input device(s) 160, the output device(s) 170, the mass storage device(s) 180 and/or the network via the bus 140 and the interface circuit 150.

While the components shown in FIG. 1 are depicted as separate functional blocks within the processor system 100, the functions performed by some of these blocks may be integrated within a single semiconductor circuit or may be implemented using two or more separate integrated circuits. For example, although the memory controller 112 and the I/O controller 114 are depicted as separate functional blocks within the chipset 110, persons of ordinary skill in the art will readily appreciate that the memory controller 112 and the I/O controller 114 may be integrated within a single semiconductor circuit.

Figure 2:
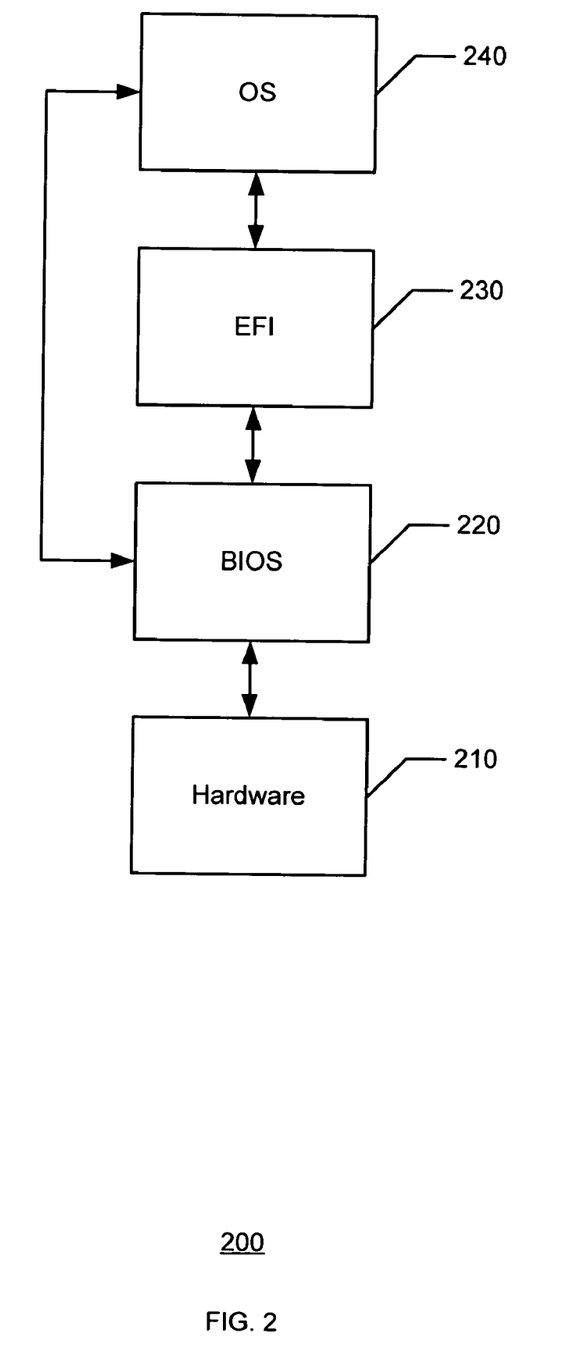
FIG. 2 is a block diagram representation of an example architectural hierarchy of the example processor system shown in FIG. 1.

In the example of FIG. 2, the illustrated architectural hierarchy 200 of the processor system 100 includes hardware 210, a BIOS 220, an extensible firmware interface (EFI) 230, and an operating system (OS) 240. Persons of ordinary skill in the art will readily recognize that hardware 210 may include any physical aspect of the processor system 100 such as the processor 120 and the main memory 130. Hardware 210 also includes the interface circuit 150, input device(s) 160, output devices 170, and/or the mass storage device 180. Basically, hardware 210 is any or all of the components shown in FIG. 1. The BIOS 220 may be implemented as software, firmware or machine readable instructions configured to boot up (i.e., start up) the processor system 100 in a conventional manner. To boot the OS 240 (e.g., Windows® and/or Linux) and to run pre-boot applications, the BIOS 220 manages data flow between the hardware 210 of the processor system 100 via the EFI 230. Alternatively, the BIOS 220 may directly communicate with the OS 240 without the EFI 230 in a conventional manner.

After power-up, the processor 120 executes instructions of the BIOS 220 to boot the processor system 100. In particular, the processor 120 may load drivers to install and/or initialize components in the processor system 100 such as disk drives, video controllers, keyboard, mouse, etc. The processor 120 may also call installed protocol interfaces to enable components in the processor system 100.

Figure 3:
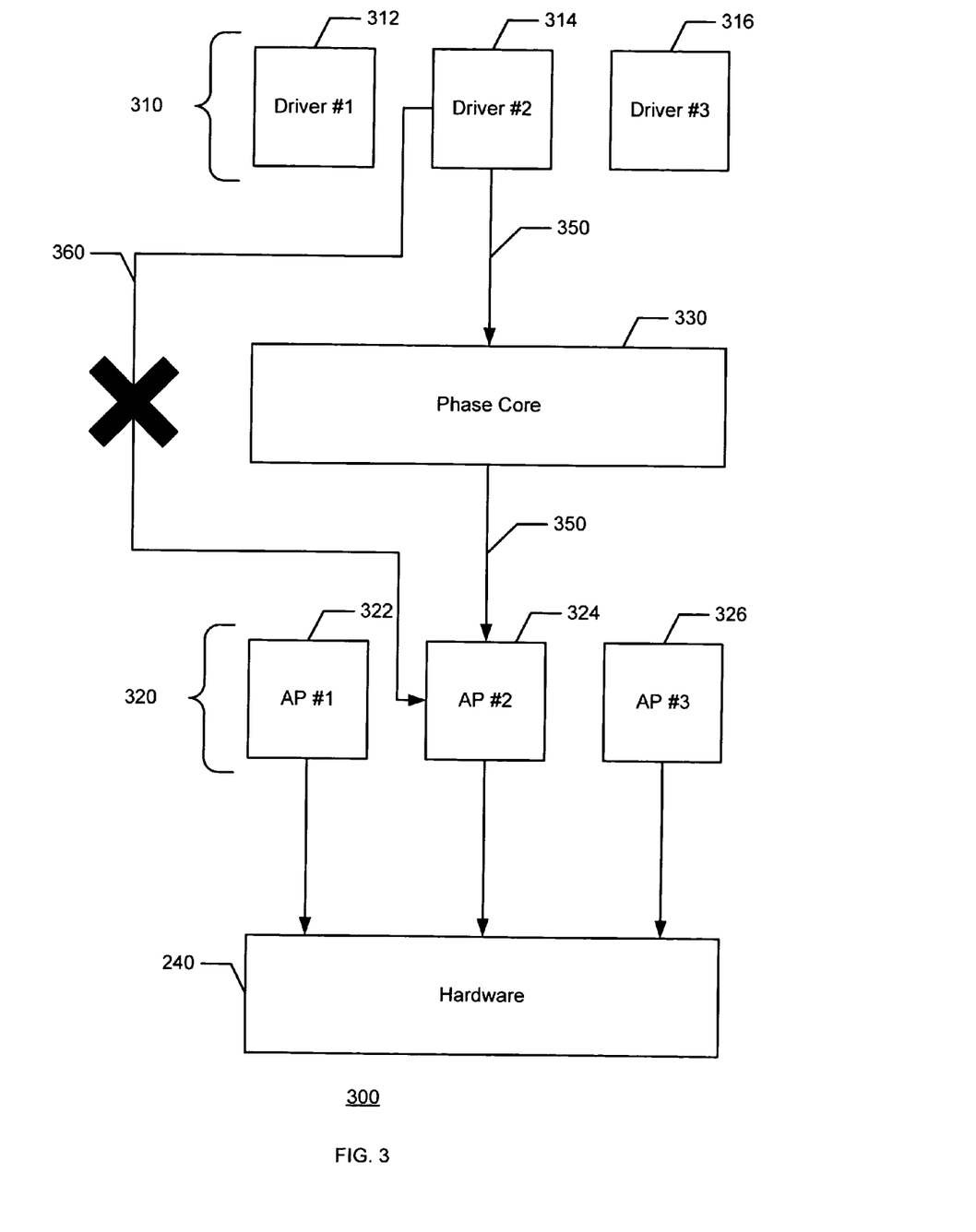
FIG. 3 is a block diagram representation of an example layout of drivers and protocol interfaces.

In the example of FIG. 3, the processor system 100 includes drivers 310, APs 320, and a phase core 330. The drivers 310 are codes configured to produce protocol interfaces to enable components in the processor system 100. For example, the processor 120 may load drivers 310 such as a driver for a keyboard (i.e., Driver #1 312), a driver for a printer (i.e., Driver #2 314), a driver for a monitor (i.e., Driver #3 316), etc. to enable those devices in the processor system 100.

The APs 320, generally shown as AP #1 322, AP #2 324, and AP #3 326, provide the capabilities of the processor system 100. For example, APs 320 may include a security AP, a metronome AP, a boot device selection (BDS) AP, a runtime AP, a variable write AP, a monotonic counter AP, a status code AP, a central processing unit (CPU) AP, a time AP, a watchdog AP, a variable AP, a reset AP, and a real time clock AP of the processor system 100. Persons of ordinary skill in the art will readily recognize the services provided by each of the listed APs and that others APs may be included.

The phase core 330 consists of data tables containing platform-related information to filter communication between the drivers 310 and the APs 320. For example, the phase core 330 may be configured to operate during a pre-EFI initialization (PEI) phase (i.e., before the main memory 130 is enabled) and/or during a driver execution environment (DXE) phase (i.e., after the main memory 130 is enabled) to boot up the processor system 100. The phase core 330 also includes boot and runtime services that are available to the OS 240 of the processor system 100. Accordingly, the phase core 330 provides a standard environment for booting the OS 240 and running pre-boot applications.

In addition, the phase core 330 may directly call the APs 320 (e.g., an application program interface (API) call) and determine whether the drivers 310 may access one or more APs 320. In particular, the phase core 330 may also process a handle protocol associated with one of the drivers 310. The handle protocol indicates a list of one or more protocols that can respond to requests of a variety of services. The phase core 330 uses a globally unique identifier (GUID) (e.g., a 128-bit value) to differentiate services and structures in the boot services environment. A protocol consists of the 128-bit GUID and a protocol interface structure. The protocol interface structure contains the functions and data used to access a device. Thus, the phase core 330 may differentiate between the APs 320 based on the GUIDs.

Without the supervision of the phase core 330, however, one of the drivers 310 may discover and inadvertently or maliciously call 360 one or more APs 320. Thus, a set of services provided by one or more APs 320 may be disabled by of the unauthorized call 360. For example, Driver #2 314 may directly call AP #2 324 (e.g., CPU AP) and disable interrupt services via AP #2 324 when the phase core 330 is operating under the assumption that interrupt services are enabled. Further, the APs 320 may be inadvertently or maliciously replaced by one of the drivers 310. For example, Driver #2 314 may attempt to uninstall and replace AP #2 324. Alternatively, Driver #2 314 may be installed in addition to AP #2 324, and the phase core 330 may incorrectly call Driver #2 314 rather than calling AP #2 324. As a result, the phase core 330 may properly call 350 one or more APs 320 whereas none of the drivers 310 may directly call 360 any of the APs 320.

To prevent APs 320 from being called inadvertently or maliciously, the processor 120 may designate certain APs 320 as restricted protocol interfaces. For example, AP #1 322 may be designated as a restricted protocol interface by being assigned with a SINGLE_CONSUMER tag so that only one caller (e.g., the phase core 330) may call on AP #1 322. As other examples, AP #1 322 may be assigned with either a NO_INSTALL tag or a NO_PEERS tag. The NO_INSTALL tag prevents a protocol associated with a driver from removing the restricted protocol interface (i.e., uninstall) and substituting another protocol for the restricted protocol interface. Accordingly, reinstall operation requested by the driver fails when executed against the restricted protocol interface. The NO_PEERS tag prevents other protocols with the same GUID as the restricted protocol interface from being installed. That is, a version of the protocol associated with the driver is already installed (i.e., the restricted protocol interface) so the install operation requested by the driver fails when executed against the restricted interface. As a result, restricted protocol interfaces of the processor system 100 protected from unauthorized access (i.e., access by a caller other than the phase core 330).

Figure 4:
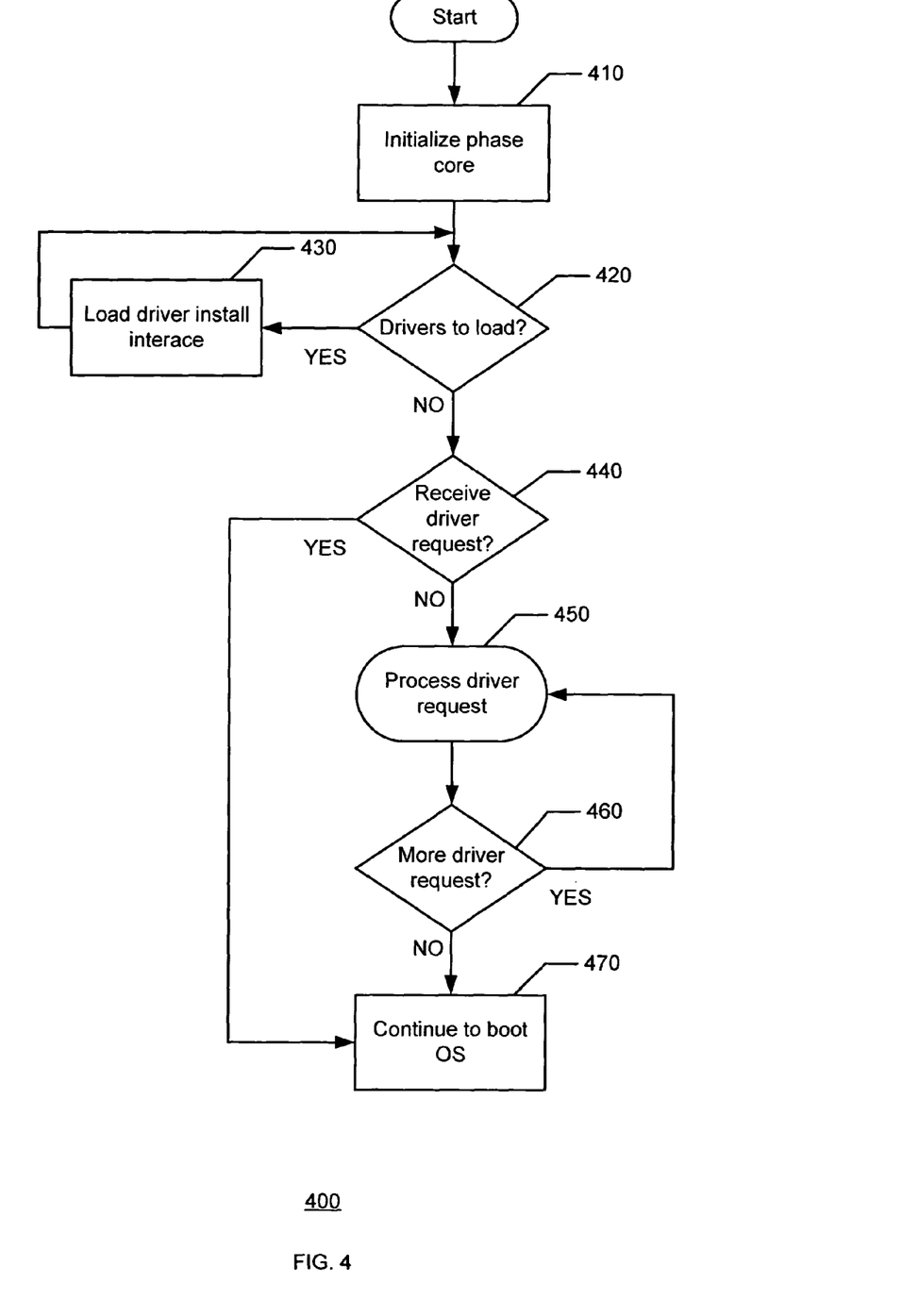
FIG. 4 is a flow diagram representation of example machine readable instructions that may protect a protocol interface.

Machine readable instructions that may be executed by the processor system 100 (e.g., via the processor 120) to implement protecting a protocol interface are illustrated in FIG. 4. Persons of ordinary skill in the art will appreciate that the instructions can be implemented in any of many different ways utilizing any of many different programming codes stored on any number of many computer-readable mediums such as a volatile or nonvolatile memory or other mass storage device (e.g., a floppy disk, a CD, and a DVD). For example, the machine readable instructions may be embodied in a machine-readable medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of steps is illustrated in FIG. 4, persons of ordinary skill in the art will appreciate that these steps can be performed in other temporal sequences. Again, the flow chart 400 is merely provided as an example of one way to program the processor system 100 to protect a protocol interface.

In the example of FIG. 4, the processor system 100 is booted up by initializing the phase core 330 (block 410). As noted above, for example, the phase core 330 may be either a PEI core or a DXE core of firmware in the processor system 100. The processor 120 (e.g., via the phase core 330) then determines whether to load a driver for a component in the processor system 100 (block 420). When a driver that needs to be loaded and executed, the phase core 330 serves as a dispatcher to load and invoke the driver. Accordingly, the processor 120 loads a driver install interface for the phase core 330 to control the driver (block 430). Through the driver install interface, the phase core 330 governs which protocols associated with drivers are installed.

Typically, the processor 120 loads drivers one at a time. Accordingly, the processor 120 returns to block 420 to determine whether there are additional drivers to load for execution. If not, the processor 120 proceeds to determine whether a driver request was received (block 440). If there is no driver request to process then the processor 120 continues to boot the OS 210 so that control of the processor system 100 may be transferred over to the OS 210 (block 470).

On the other hand, if the processor 120 receives a driver request to process then the processor 120 begins to process the driver request as described in detail below (block 450). Not only does the phase core 330 determine which protocols associated with loaded drivers to install, but it also governs whether to permit calls to protocol interfaces that were previously installed. After processing the driver request, the processor 120 determines if there are more driver requests to process (block 460). If so, the processor 120 returns to block 450 to process other driver requests. Otherwise, the processor 120 proceeds to block 470 to continue booting the OS 210.

To process a driver request of a loaded driver, the processor 120 determines whether the driver request is associated with a violation condition of a protocol interface to prevent the protocol interface from being called on inadvertently or maliciously. In the example of flow chart 500 in FIG. 5, the processor 120 may determine if the driver request is associated with a violation condition by determining whether the driver request is a request to access a restricted protocol interface (e.g., a platform password protocol previously installed to the processor system 100) by the loaded driver (block 510). In particular, the processor 120 may process a handle protocol associated with the loaded driver. As noted above, the handle protocol associated with the loaded driver points to a list of one or more protocols configured to respond to requests for services. The loaded driver may attempt to access the restricted protocol interface. For example, the restricted protocol interface may be accessible by only one caller such as the phase core 330 to prevent the restricted protocol interface from being corrupted. Accordingly, the processor 120 rejecs the request (e.g., protects the restricted protocol interface from the loaded driver by storing the restricted protocol interface in a protocol database (i.e., hiding the restricted protocol interface from the loaded driver)) (block 525). For example, the protocol database may be a data structure stored in the main memory 130 and/or one or more mass storage devices 180. The protocol database may be configured to store one or more restricted protocol interfaces.

Figure 5:
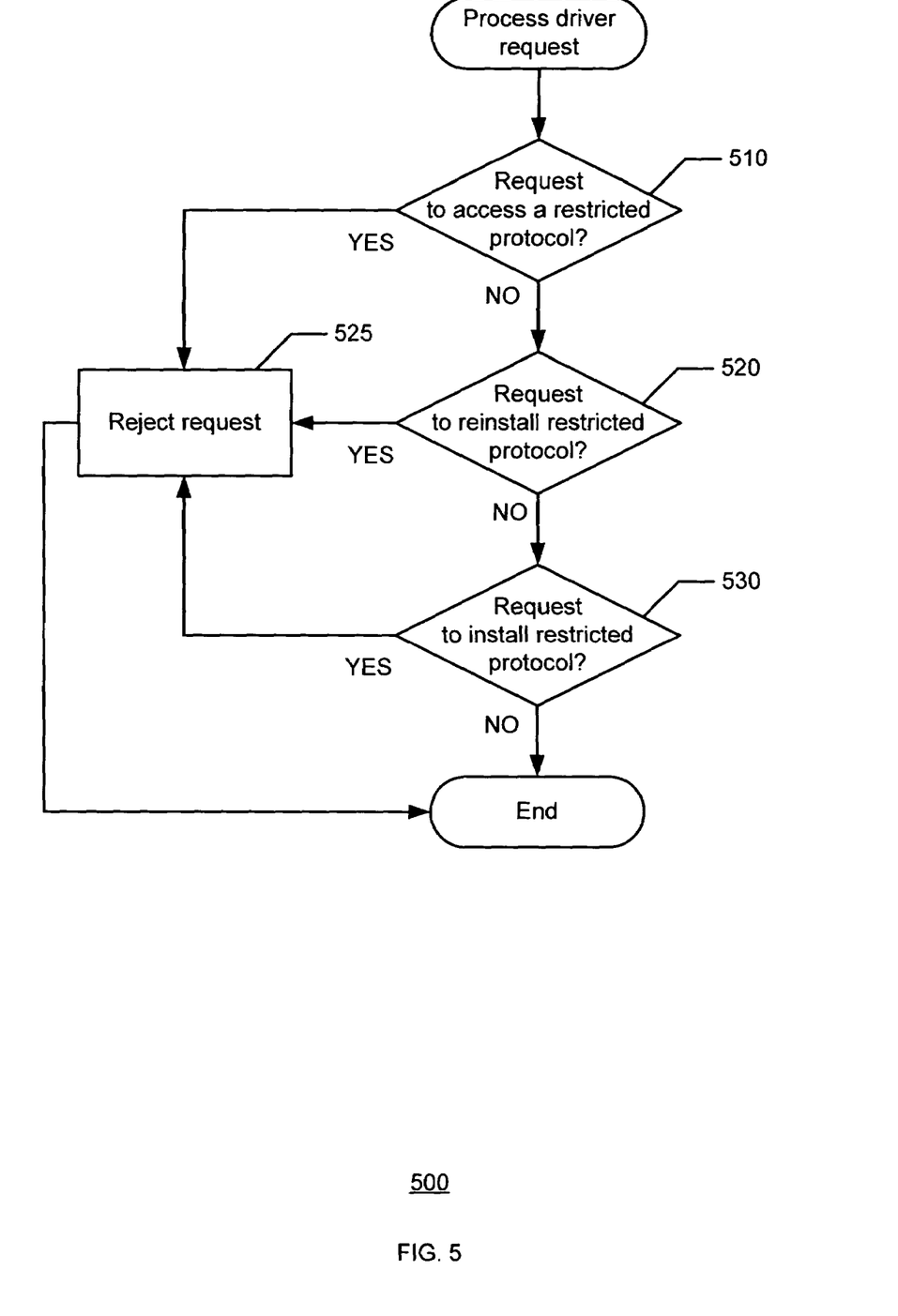
FIG. 5 is a flow diagram representation of example machine readable instructions that may process a driver request.

If the processor 120 determines that the driver request is not a request to access the restricted protocol interface by the loaded driver, then the processor 120 determines whether the driver request is a reinstall request by the loaded driver (block 520). That is, the loaded driver may attempt a call directly to the restricted protocol interface (e.g., one shown as 350 in FIG. 3). As noted above, the phase core 330 should make the call to the restricted protocol interface rather than the loaded driver to protect the restricted protocol interface from being replaced and/or corrupted because the reinstall request allows the loaded driver to uninstall and/or substitute the restricted protocol interface. If the driver request is a reinstall request, then the processor 120 may reject the reinstall request by the loaded driver (block 525).

On the other if the driver request is not a reinstall request, the processor 120 may determine if the driver request is an install request by the loaded driver (block 530). In particular, the loaded driver may request to add a new protocol to the processor system 100. If the restricted protocol interface is the same as the new protocol associated with the loaded driver (i.e., the restricted protocol interface has the same GUID as the new protocol), the processor 120 may reject the install request by the loaded driver to avoid duplicates (block 525).

Figure 6:
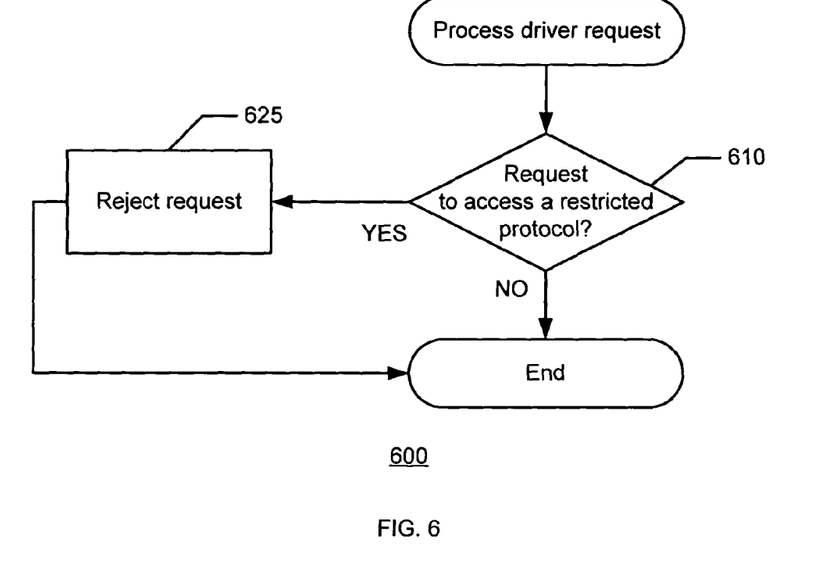
FIG. 6 is a flow diagram representation of alternative example machine readable instructions that may process the driver request.

While FIG. 5 is depicted to include blocks 510, 520, and 530 to determine if the loaded driver is associated with a violation condition, the processor 120 may also determine if the loaded driver is associated with a violation condition by implementing only one of blocks 510, 520, and 530. Referring to flow chart 600 of FIG. 6, for example, the processor 120 may determine whether the driver request is a request by the loaded driver to access a restricted protocol interface installed in the processor system 100 (block 610). If the driver request is a request by the loaded driver to access a restricted protocol interface, the processor 120 may reject the request (e.g., protect the restricted protocol interface from the loaded driver by storing the restricted protocol interface in a protocol database (i.e., hiding the restricted protocol interface from the loaded driver)) (block 625).

Figure 7:
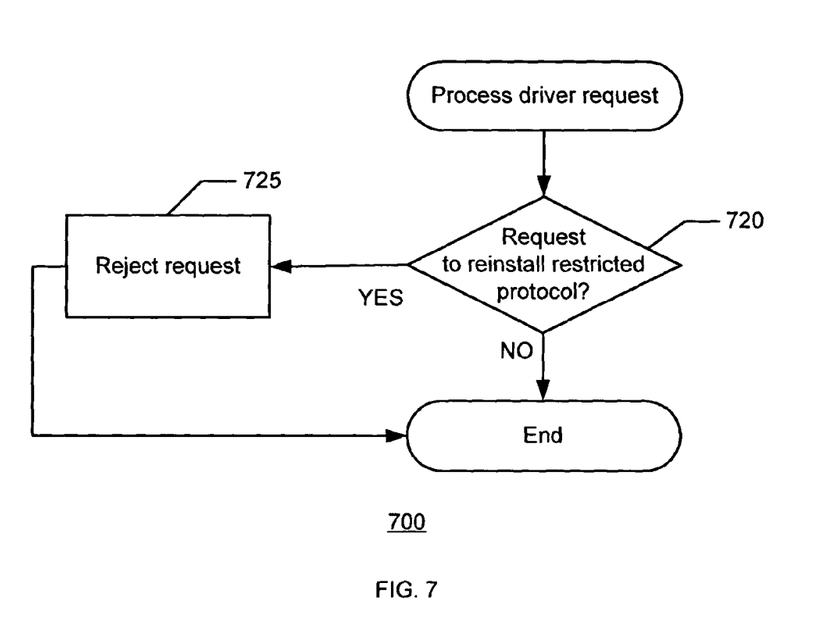
FIG. 7 is a flow diagram representation of alternative example machine readable instructions that may process the driver request.

In another example, the processor 120 may determine whether the driver request is a reinstall request from the loaded driver (block 720) to determine if the loaded driver is associated with a violation condition as shown in flow chart 700 of FIG. 7. That is, the loaded driver may request to uninstall and substitute a restricted protocol interface, which was previously installed to the processor system 100. Accordingly, the processor 120 may reject the reinstall request by the loaded driver (block 725).

Figure 8:
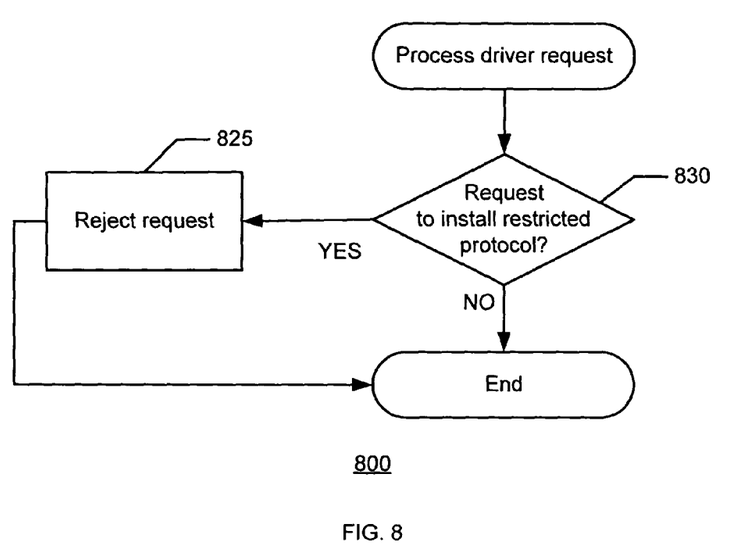
FIG. 8 is a flow diagram representation of alternative example machine readable instructions that may process the driver request.

In yet another example, the processor 120 may determine whether the driver request is an install request from the loaded driver (block 830) to determine if the loaded driver is associated with a violation condition as shown flow chart 800 in FIG. 8. The loaded driver may request to install a new protocol. If a restricted protocol interface is the same as the new protocol associated with the loaded driver (i.e., the restricted protocol interface has the same GUID as the new protocol), the processor 120 may reject the install request by the loaded driver (block 825).

Figure 9:
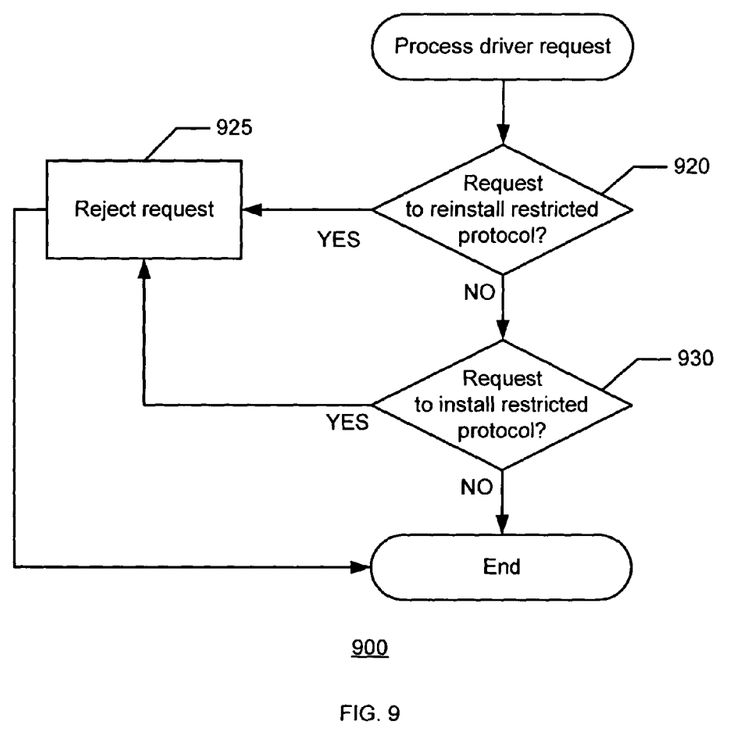
FIG. 9 is a flow diagram representation of alternative example machine readable instructions that may process the driver request.

Alternatively, the processor 120 may implement a combination of blocks 510, 520, and 530. That is, the processor 120 may implement two of the blocks 510, 520, and 530. Referring to flow chart 900 of FIG. 9, for example, the processor 120 may determine whether the driver request is a reinstall request (block 920) and determine whether the driver request is an install request by the loaded driver (block 930) to determine if the loaded driver is associated with a violation condition. Accordingly, the processor 120 may reject the reinstall or install request by the loaded driver (block 925).

Figure 10:
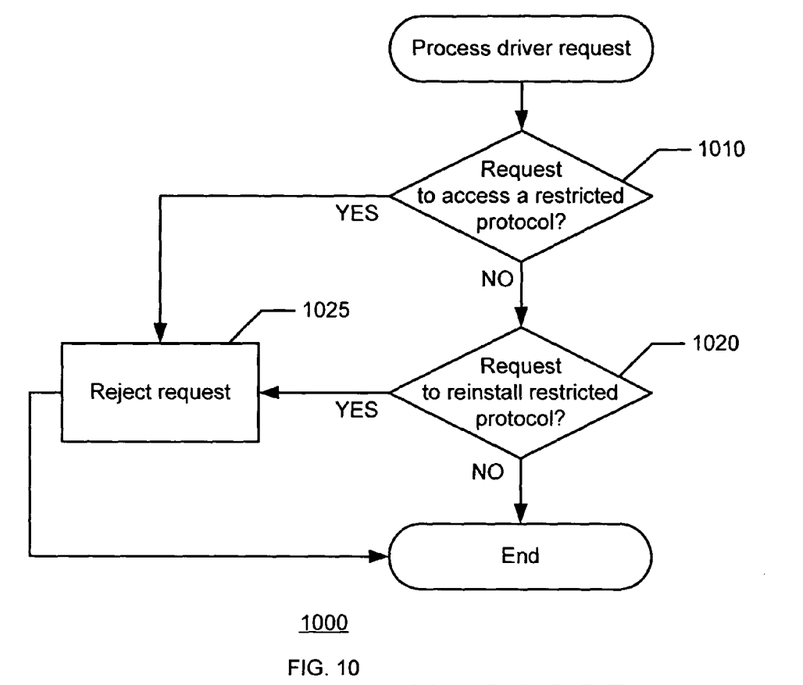
FIG. 10 is a flow diagram representation of alternative example machine readable instructions that may process the driver request.

In another example, the processor 120 may determine whether the driver request is a request to access a restricted protocol interface (block 1010) and determine whether the driver request is a reinstall request (block 1020) to determine if the loaded driver is associated with a violation condition as shown in flow chart 1000 of FIG. 10. The processor 120 may store the restricted AP in the protocol database to reject the reinstall request by the loaded driver (block 1025).

Figure 11:
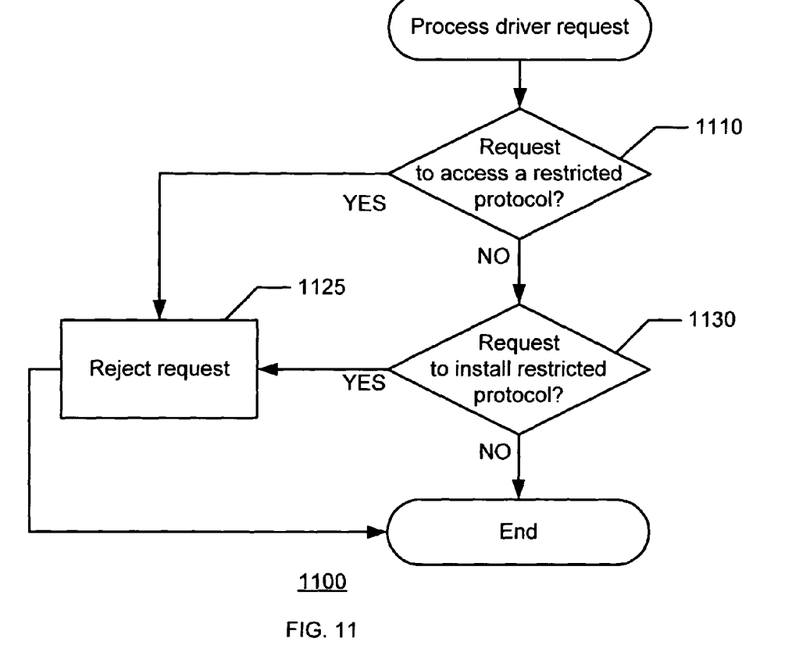
FIG. 11 is a flow diagram representation of alternative example machine readable instructions that may process the driver request.

As yet another example, the processor 120 may determine whether the driver request is a request to access a restricted protocol interface (block 1110) and determine whether the driver request is an install request by the loaded driver (block 1130) to determine if the loaded driver is associated with a violation condition as shown in flow chart 1100 of FIG. 11. The processor 120 may store the restricted protocol interface in the protocol database to reject the install request by the loaded driver (1125). As a result, the restricted protocol interfaces of the processor system 100 (i.e., the APs 320) are protected from unauthorized access (e.g., access by callers other than the phase core 330).

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to protect a protocol interface comprising:
   receiving a driver request from a driver during an operation phase of firmware in a processor system;
   identifying the driver request as a request associated with a violating condition of the protocol interface; and
   rejecting the driver request, wherein rejecting the driver request comprises storing the protocol interface in a data structure in response to identifying a request by a driver to access an architectural protocol installed in the processor system and in response to identifying the driver request as a request associated with a violating condition of the protocol interface, wherein receiving the driver request during the operating phase of firmware comprises receiving the driver request during one of a pre-EFI initialization (PEI) phase and a driver execution environment (DXE) phase.

2. A method as defined in claim 1, wherein identifying the driver request as the request associated with the violating condition of the protocol interface comprises identifying at least one of a request to access an architectural protocol installed in the processor system, a reinstall request, and an install request by a driver.

3. A method as defined in claim 1, wherein identifying the driver request as a request associated with the violating condition of the protocol interface comprises identifying the driver request associated with a violating condition of a central processing unit (CPU) architectural protocol.

4. A method as defined in claim 1, wherein rejecting the driver request comprises rejecting one of a reinstall request and an install request by a driver.

5. A machine readable medium storing instructions, which when executed, cause a machine to:
   receive a driver request during an operation phase of firmware in a processor system;
   identify the driver request as a request associated with a violating condition of a protocol interface; and
   reject the driver request by storing the protocol interface in a data structure in response to identifying a request by a driver to access an architectural protocol installed in the processor system and in response to identifying the driver request as a request associated with a violating condition of the protocol interface, wherein the instructions cause the machine to receive the driver request during an operating phase of firmware by receiving the driver request during one of a pre-EFI initialization (PEI) phase and a driver execution environment (DXE) phase.

6. A machine readable medium as defined in claim 5, wherein the instructions cause the machine to identify the driver request associated with the violation condition of the protocol interface by identifying at least one of a request to access an architectural protocol installed in the processor system, a reinstall request, and an install request by a driver.

7. A machine readable medium as defined in claim 5, wherein the instructions cause the machine to identify the driver request associated with the violation condition of the protocol interface by identifying the driver request associated with a violating condition of a central processing unit (CPU) architectural protocol.

8. A machine readable medium as defined in claim 5, wherein the instructions cause the machine to reject the driver request by rejecting one of a reinstall request and an install request by a driver.

9. A machine readable medium as defined in claim 5, wherein the machine readable medium comprises one of a programmable gate array, application specific integrated circuit, erasable programmable read only memory, read only memory, random access memory, magnetic media, and optical media.

10. A processor system to protect a protocol interface comprising:
    a memory configured to store one or more protocol interfaces;
    a processor operatively coupled to the memory and to a machine readable medium storing instructions that, when executed, cause the processor to receive a driver request from a driver during an operation phase of firmware in the processor system, to identify the driver request as a request associated with a violating condition of the protocol interface by the driver, to reject the driver request, and store the protocol interface in the data structure in response to identifying a request by a driver to access an architectural protocol installed in the processor system and in response to identifying the driver request as a request associated with a violating condition of the protocol interface, wherein the operation phase comprises one of a pre-EFI initialization (PEI) phase and a driver execution environment (DXE) phase.

11. A processor system as defined in claim 10, wherein the driver request comprises one of a request to access an architectural protocol installed in the processor system, a reinstall request, and an install request by the driver.

12. A processor system as defined in claim 10, wherein the protocol interface comprises a central processing unit (CPU) architectural protocol.

* * * * *